(12) United States Patent
Touze et al.

(10) Patent No.: US 12,203,389 B2
(45) Date of Patent: Jan. 21, 2025

(54) COMPOSITE BLADE FOR AN AIRCRAFT ENGINE AND METHODS FOR MANUFACTURING AND REPAIRING SAME

(71) Applicant: SAFRAN, Paris (FR)

(72) Inventors: Adrien Touze, Moissy-Cramayel (FR); Nicolas Pierre Lanfant, Moissy-Cramayel (FR); Romain Picon, Moissy-Cramayel (FR); Loïc Sorgnard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 63 days.

(21) Appl. No.: 17/779,794

(22) PCT Filed: Nov. 23, 2020

(86) PCT No.: PCT/FR2020/052150
§ 371 (c)(1),
(2) Date: May 25, 2022

(87) PCT Pub. No.: WO2021/105600
PCT Pub. Date: Jun. 3, 2021

(65) Prior Publication Data
US 2023/0036890 A1    Feb. 2, 2023

(30) Foreign Application Priority Data
Nov. 29, 2019  (FR) ........................................ 1913477

(51) Int. Cl.
*F01D 5/28*  (2006.01)
*F01D 5/14*  (2006.01)

(52) U.S. Cl.
CPC ............. *F01D 5/282* (2013.01); *F01D 5/147* (2013.01); *F05D 2230/20* (2013.01)

(58) Field of Classification Search
CPC ......... F01D 5/282; F01D 5/147; B29C 70/24; B29C 70/48; B29C 70/68; B29C 70/86;
(Continued)

(56) References Cited

U.S. PATENT DOCUMENTS 3,762,835 A * 10/1973 Carlson ................... F01D 5/147
29/889.71
5,174,024 A * 12/1992 Sterrett ................... F01D 5/147
29/889.71
(Continued)

FOREIGN PATENT DOCUMENTS

| EP | 2867473 A2 | 5/2015 |
| EP | 3263836 A1 | 1/2018 |

(Continued)

OTHER PUBLICATIONS

Written Opinion of the International Searching Authority mailed Mar. 4, 2021, issued in corresponding International Application No. PCT/FR2020/052150, filed Nov. 23, 2020, 7 pages.
(Continued)

*Primary Examiner* — Kenneth Bomberg
*Assistant Examiner* — Cameron A Corday
(74) *Attorney, Agent, or Firm* — Christensen O'Connor Johnson Kindness PLLC

(57) ABSTRACT

A process for manufacturing a blade made of composite material for a turbomachine. The blade includes an airfoil having a pressure side and a suction side which extend from a leading edge to a trailing edge of the airfoil. The blade further includes a metal sheath that extends along the leading edge of the airfoil. The process includes the steps of: placing a preform, produced by three-dimensionally weaving fibers, in a mold, the sheath being positioned on an edge of the preform intended to form the leading edge of the airfoil; and injecting polymerizable resin into the mold to
(Continued)

impregnate the preform so as to form the airfoil after solidifying. At least one double-sided adhesive film may be inserted between the sheath and the edge of the preform prior to injection of the resin.

13 Claims, 6 Drawing Sheets

(58) Field of Classification Search
CPC ............. B29D 99/0025; F05D 2230/20; F05D 2230/23
See application file for complete search history.

(56) References Cited

U.S. PATENT DOCUMENTS

| | | | |
|---|---|---|---|
| 9,108,331 B2 | 8/2015 | Grosbois et al. | |
| 10,138,738 B2* | 11/2018 | Obuchi | ................. F04D 29/542 |
| 10,864,689 B2 | 12/2020 | Techer et al. | |
| 10,994,504 B2 | 5/2021 | Techer et al. | |
| 11,208,904 B2 | 12/2021 | Blanquart et al. | |
| 2007/0092379 A1 | 4/2007 | Coupe et al. | |
| 2008/0075601 A1* | 3/2008 | Giusti | ................... F04D 29/324 |
| | | | 416/229 A |
| 2008/0159868 A1* | 7/2008 | Kray | ..................... F04D 29/324 |
| | | | 416/223 R |
| 2011/0194941 A1* | 8/2011 | Parkin | ..................... B29C 70/48 |
| | | | 416/224 |
| 2013/0220537 A1* | 8/2013 | Parkin | ....................... F01D 5/14 |
| | | | 156/60 |
| 2013/0239586 A1* | 9/2013 | Parkin | ..................... F01D 5/282 |
| | | | 156/60 |
| 2013/0276991 A1 | 10/2013 | Varin | |
| 2015/0132140 A1* | 5/2015 | Haag | ..................... F03D 1/0633 |
| | | | 416/224 |
| 2018/0111332 A1 | 4/2018 | Collis et al. | |
| 2023/0193766 A1* | 6/2023 | Postec | ..................... B29C 65/00 |
| | | | 416/230 |

FOREIGN PATENT DOCUMENTS

| | | |
|---|---|---|
| FR | 2956057 A1 | 8/2011 |
| FR | 3029134 A1 | 6/2016 |
| FR | 3051386 A1 | 11/2017 |
| WO | 2014196987 A2 | 12/2014 |
| WO | 2015/034612 A1 | 3/2015 |
| WO | 2019/186029 A1 | 10/2019 |

OTHER PUBLICATIONS

International Preliminary Report on Patentability mailed May 17, 2022, issued in corresponding International Application No. PCT/FR2020/052150, filed Nov. 23, 2020, 1 page.

International Search Report mailed Mar. 4, 2021, issued in corresponding International Application No. PCT/FR2020/052150, filed Nov. 23, 2020, 3 pages.

Written Opinion of the International Searching Authority mailed Mar. 4, 2021, issued in corresponding International Application No. PCT/FR2020/052150, filed Nov. 23, 2020, 9 pages.

* cited by examiner

[Fig.1]
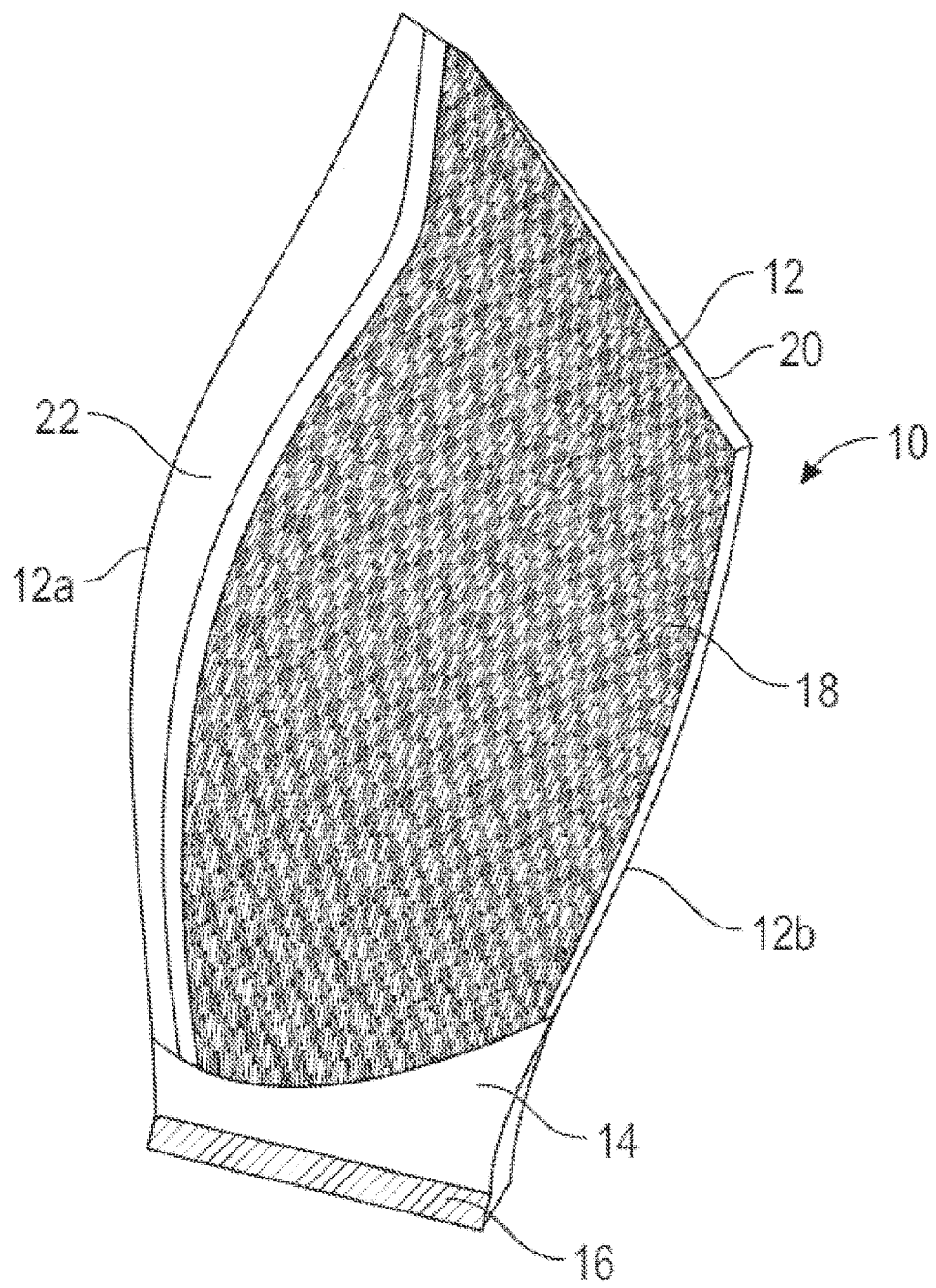

[Fig.2]
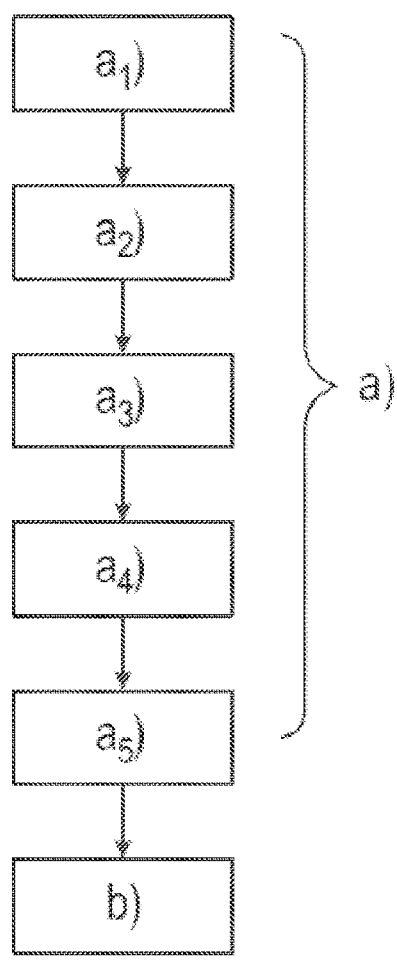

[Fig.3]
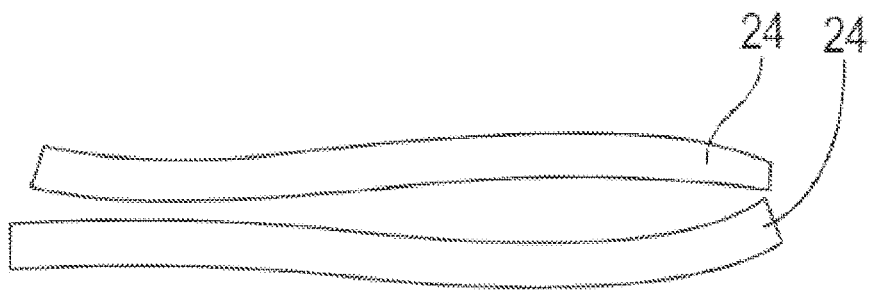
[Fig.4]
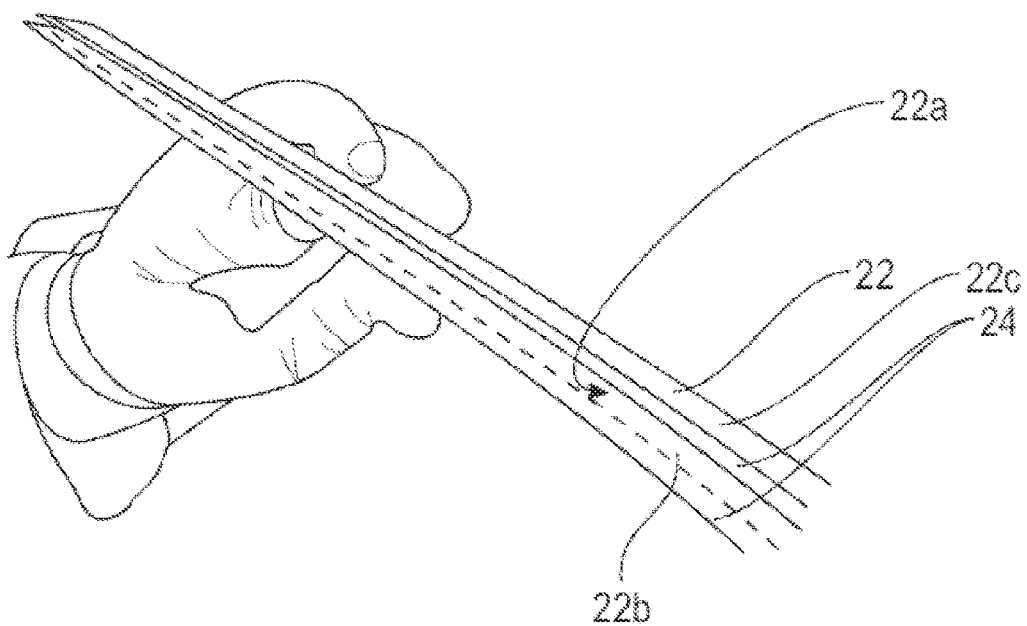

[Fig.5]
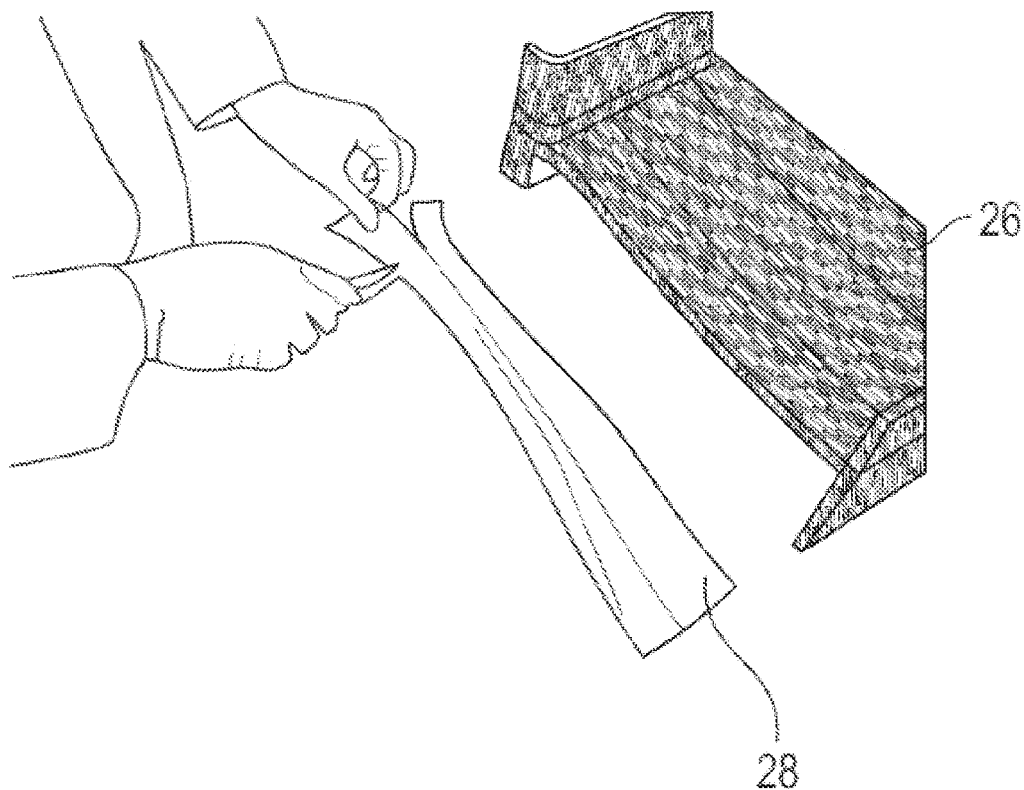
[Fig.6]
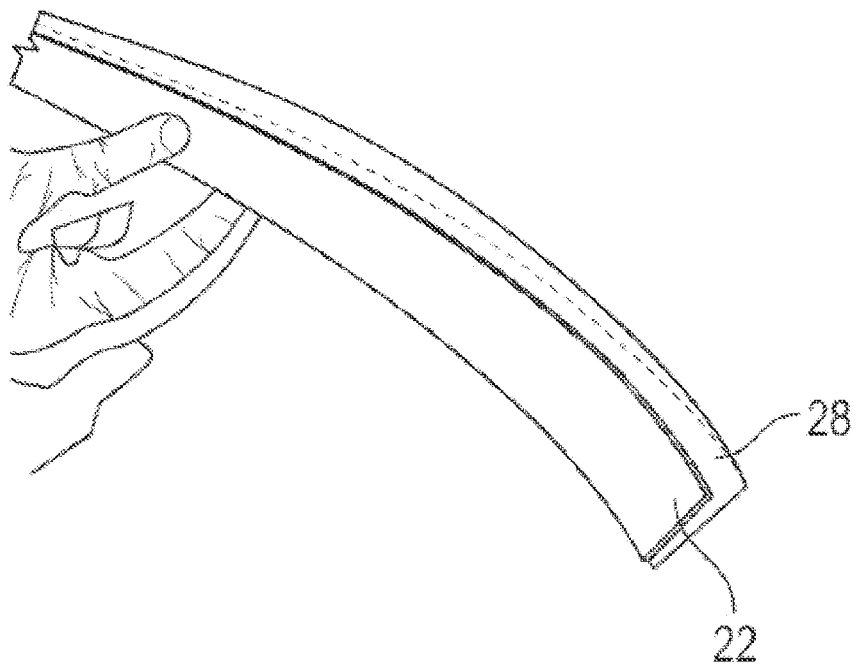

[Fig.7]
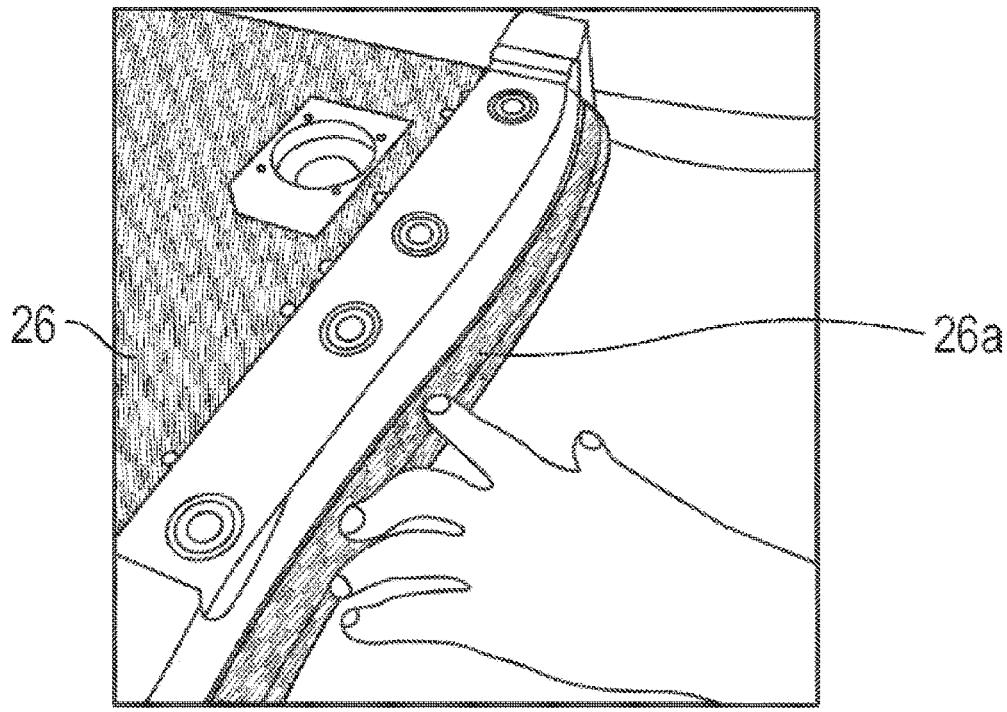
[Fig.8]
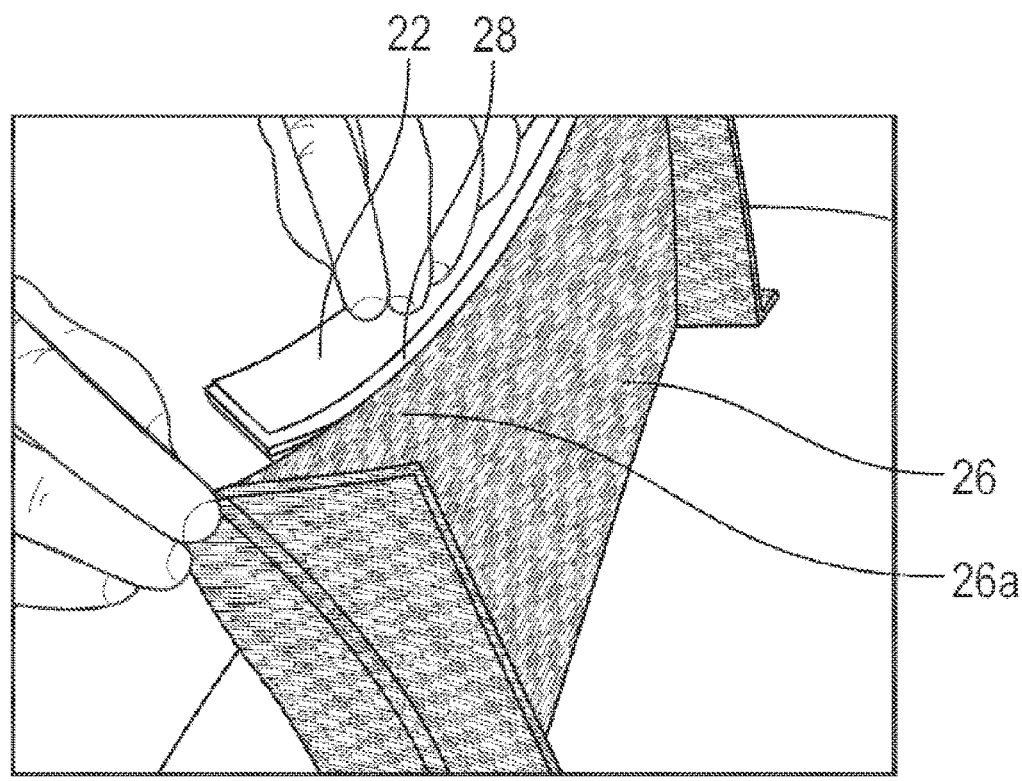

[Fig.9]
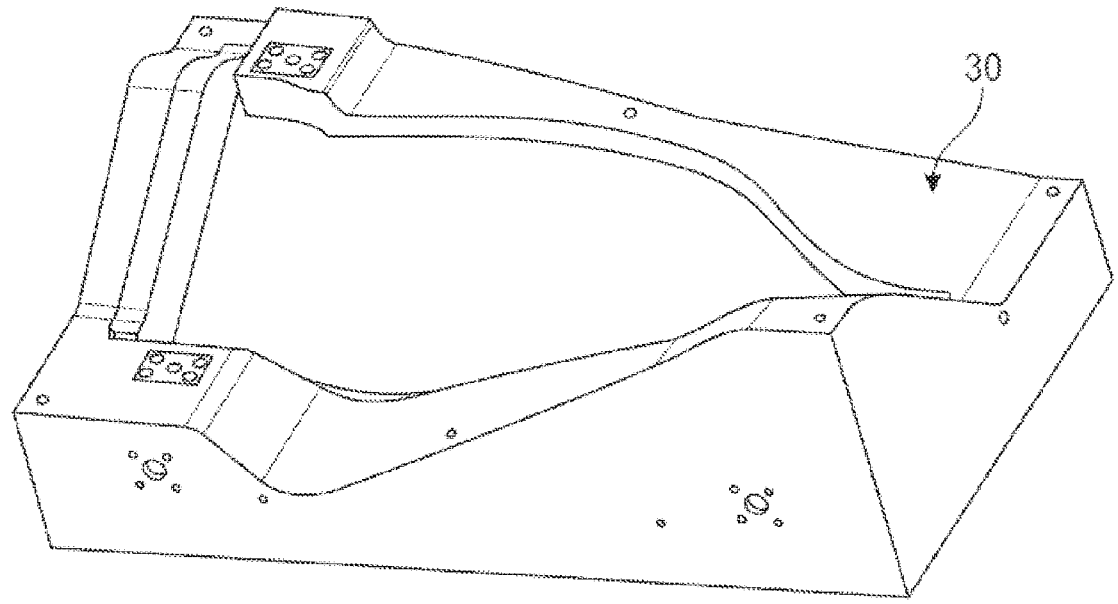
[Fig.10]
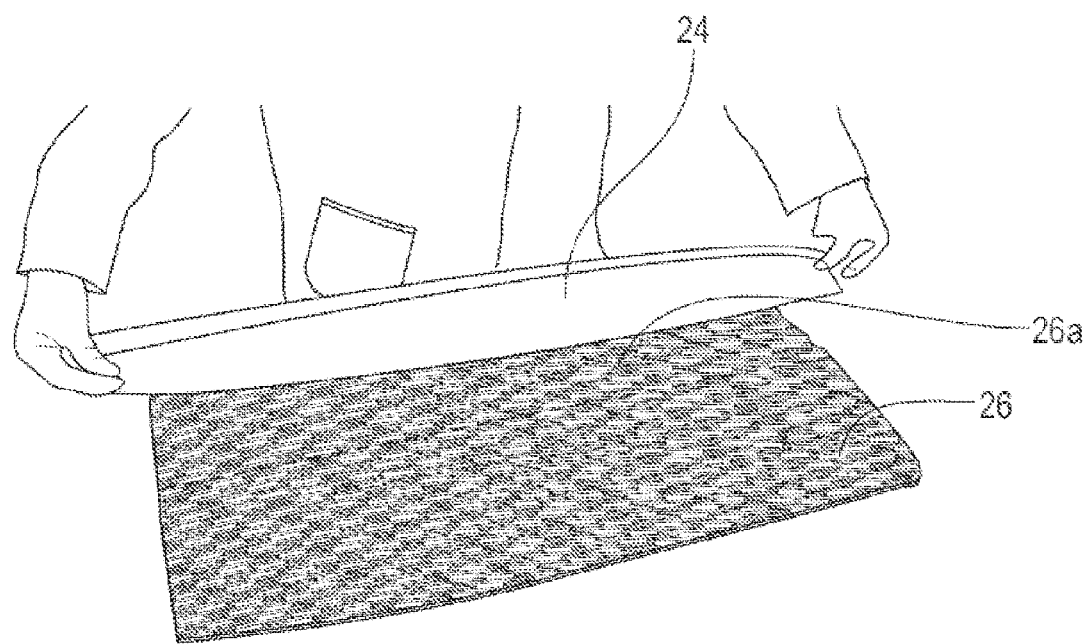

COMPOSITE BLADE FOR AN AIRCRAFT ENGINE AND METHODS FOR MANUFACTURING AND REPAIRING SAME

TECHNICAL FIELD OF THE INVENTION

The present invention relates to a composite material blade for an aircraft turbomachine, as well as to methods for manufacturing and repairing such a blade.

TECHNICAL BACKGROUND

The prior art comprises in particular the documents FR-A1-2 956 057, FR-A1-3 029 134, FR-A1-3 051 386, US-A1-2011/194941 and US-A1-2007/092379.

The use of composite materials is advantageous in the aeronautical industry in particular because these materials have interesting mechanical performances for relatively low masses.

One method for manufacturing a composite part for the aeronautical industry, which is well known to the person skilled in the art, is the RTM moulding method, whose initials refer to Resin Transfer Molding.

This is a method for producing a composite material part based on resin-impregnated fibres. Such a method is used, for example, to manufacture a fan blade and comprises several successive steps.

First, the fibres are woven together to obtain a three-dimensional preform blank, and then the blank is cut to obtain a preform having substantially the shape of the blade to be obtained. This preform is then placed in an injection mould, which is closed. Then the resin is injected in a liquid state by maintaining a pressure on the injected resin while the part is polymerized by heating.

The resins used are very fluid resins that are able to penetrate the fibres of the preform well, even when injected under a reduced pressure. During the polymerization, under the effect of heat, the injected resin passes successively from the liquid state to the gelled state and finally to the solid state.

For the manufacturing of a blade, for example for a turbomachine fan, a preform is made by weaving and then impregnated with the resin to form a vane. This vane comprises a pressure side and a suction side that extend from a leading edge to a trailing edge of the vane.

The composite material of the vane is relatively fragile, and in particular sensitive to shocks, and it is known to protect it by means of a metal sheath which is fitted and attached on the leading edge of the vane.

The sheath can be attached to the vane in two ways. A first way consists in gluing the sheath to the vane, after polymerization of the resin. The glue is then presented in the form of a paste.

Another way consists in attaching the sheath by co-moulding with the fibrous preform. The preform is placed in the mould and the sheath is positioned on the edge of the preform intended to form the leading edge of the vane. The injected resin impregnates the preform and comes into contact with the sheath to ensure its integrity to the vane after polymerization and curing.

The present invention relates to an improvement to this second technology in which the sheath and the preform undergo a co-moulding.

The document US-A1-2007/0092379 has already proposed to spread a paste-like glue between the sheath and the preform, prior to the injection of resin into the preform, so as to form a layer or a film of glue between these elements.

However, this operation is delicate and has several disadvantages: it is difficult to ensure that the glue is well spread over the entire surface to be glued, and it is not possible to guarantee a constant thickness of glue on this surface. In conclusion, this solution is not optimal and cannot be industrialized because the manufacturing can hardly be done with a good level of repeatability.

The invention provides a simple, effective and economical solution to ensure a correct positioning and optimal mechanical strength of the sheath on the blade.

SUMMARY OF THE INVENTION

The invention proposes a method for manufacturing a blade of composite material for a turbomachine, in particular for an aircraft, this blade comprising a vane comprising a pressure side and a suction side which extend from a leading edge to a trailing edge of the vane, the blade further comprising a metal sheath extending along the leading edge of the vane, the method comprising the steps consisting in:
  a) placing a preform made by weaving fibres in three dimensions in a mould, the sheath being positioned on an edge of the preform intended to form the leading edge of the vane,
  b) injecting polymerizable resin into the mould to impregnate the preform so as to form the vane after solidification, characterised in that at least one double-sided adhesive film is interposed between the sheath and the edge of the preform during the step a).

The invention thus proposes to ensure the attachment of the sheath to the vane by co-moulding and by a double-sided adhesive film, i.e. by a strip or a tape of adhesive material. The adhesive film is interposed between the sheath and the edge of the preform and is intended to improve and maintain the position of the sheath on the edge of the preform, and also to improve the hold and the tear resistance of the sheath to the vane. It is therefore understood that, during the injection of resin into the manufacturing mould of the vane, this resin will impregnate the preform and will also come into contact with the film or even the sheath, thus ensuring an optimal attachment of the sheath on the blade.

The method according to the invention may comprise one or more of the following characteristics, taken alone or in combination with each other:
  said adhesive film is cut according to the shape of the edge and/or the sheath during the step a);
  the adhesive film is glued on the edge of the preform prior to the positioning of the sheath on that edge;
  the sheath is dihedral in shape and defines a groove with a V-shaped cross-section, with said at least one adhesive film being glued on the sheath within the groove;
  a first adhesive film is glued in the groove, on a first longitudinal wall of the sheath, and a second adhesive film is glued in the groove, on a second longitudinal wall of the sheath;
  prior to the positioning of the sheath on the edge of the preform, this edge is compressed;
  the edge of the preform is compressed until it reaches a thickness representing 75% to 95% of a maximum transverse width or dimension of the groove at the end of the step b);
  the preform is moistened prior to compressing its edge;
  at least one interface fabric is interposed between the preform and the adhesive film, and extends along said edge of the preform; the fabric is particularly advantageous in particular when repairing the blade, as will be discussed below;

a single interface fabric is folded and inserted within the groove;

the adhesive film or even the interface fabric is/are heated to promote the adhesion;

the adhesive film protrudes from the sheath and extends onto surfaces of the preform not covered by the sheath.

The present invention also relates to a blade made of composite material for a turbomachine, in particular for an aircraft, this blade comprising a vane comprising a pressure side and a suction side which extend from a leading edge to a trailing edge of the vane, the blade further comprising a metal sheath extending along the leading edge of the vane, this blade being manufactured by a method as described above and comprising at least one adhesive film between the sheath and the leading edge of the vane, or even at least one interface fabric interposed between the vane and the adhesive film.

The present invention finally relates to a method for repairing a blade as described above when equipped with said interface fabric, the sheath of this blade being damaged and needing to be replaced, the method comprising the steps consisting in:

removing the sheath and the adhesive film, with the interface fabric being intended to remain on the leading edge of the vane, and gluing a new sheath on this interface fabric.

BRIEF DESCRIPTION OF FIGURES

Further characteristics and advantages of the invention will become apparent from the following detailed description, for the understanding of which reference is made to the attached drawings in which:

FIG. 1 is a schematic perspective view of a composite aircraft turbomachine blade, FIG. 2 is a block diagram showing steps of a method according to the invention for manufacturing a blade such as that shown in FIG. 1, FIG. 3 is a schematic perspective view of two adhesive films used in the scope of a manufacturing method according to the invention, FIG. 4 is a schematic perspective view of a sheath to which the two films of FIG. 3 are glued, FIG. 5 is a schematic perspective view of an interface fabric being manipulated by an operator during a manufacturing method according to the invention, FIG. 6 is a schematic perspective view of a sheath on which is positioned the interface fabric of FIG. 5, FIG. 7 is a schematic perspective view of a preform with one edge undergoing a compression, FIG. 8 is a schematic perspective view of the preform of FIG. 7 to one edge of which the sheath of FIG. 6 is positioned, FIG. 9 is a schematic perspective view of a mould in which the preform and the sheath are intended to be placed, and in which the resin is intended to be injected, and FIG. 10 is a schematic perspective view of a preform to one edge of which an adhesive film is glued, and illustrates an alternative embodiment of the invention.

DETAILED DESCRIPTION OF THE INVENTION

First, reference is made to FIG. 1, which illustrates a composite material blade 10 for a turbomachine, this blade 10 being, for example, a fan blade.

The blade 10 comprises a vane 12 connected by a stilt 14 to a root 16 which has, for example, a dovetail shape and is shaped to be engaged in a complementarily shaped pocket of a rotor disc, in order to retain the blade on this disc.

The vane 12 comprises a leading edge 12a and a trailing edge 12b of the gases flowing through the turbomachine. The vane 12 has a curved or twisted aerodynamic profile and comprises a pressure side 18 and a suction side 20 extending between the leading 12a and trailing 12b edges.

The vane 12 is made from a fibrous preform obtained by three-dimensional weaving of fibres, for example carbon.

The leading edge 12a of the vane is reinforced and protected by a metal sheath 22 that is attached to this leading edge 12a. The sheath 22 is for example made of a nickel and cobalt based alloy.

In the present invention, this attachment is made on the one hand by co-moulding the preform with the sheath 22, and on the other hand by gluing the sheath 22 by means of at least one adhesive film 24.

FIG. 2 is a flowchart that illustrates steps in a method for manufacturing a composite blade 10 such as the one shown in FIG. 1.

The method may comprise several steps, some of which are optional.

The first step a) of the method comprises several sub-steps or operations. During a first operation a1) mentioned above, a fibrous preform 26 is made by weaving fibres, this preform being visible in particular in FIG. 8. The preform 26 obtained is raw and can undergo operations such as cutting for example. The ends of the fibres of the preform 26 tend to bulge on the outer surface of the preform, which can cause the preform to thicken beyond the desired final dimensions of the vane.

During a further operation a2) of the method, shown in FIG. 3, one or more adhesive films 24 are prepared. This adhesive film 24 is intended to be interposed between the sheath 22 and the preform 26, before the resin is injected into the manufacturing mould of the blade.

This adhesive film 24 is a double-sided film, i.e. a film gluing on both faces. This film is coated or soaked on both faces with a glue, for example those marketed by the company 3M under the references AF191U® or AF191K® or those marketed by the company Solvay under the reference FM3091®.

This adhesive film 24 has for example a thickness between 0.1 mm and 0.2 mm. This film 24 can be in the form of a strip. It can thus have an elongated shape whose dimensions depend on that of the sheath 22.

The sheath 22, as shown in FIG. 4, is dihedral in shape and defines a V-shaped cross-section groove 22a.

The adhesive film 24 is preferably glued on the sheath 22, inside the groove 22a. As can be seen in FIG. 3, the simplest and most effective way is to cut two adhesive films 24 and to glue them respectively on a first longitudinal wall 22b of the sheath, and on a second longitudinal wall 22c of the sheath, inside the groove 22a.

We then obtain the assembly shown in FIG. 4.

A subsequent operation a3), which is however optional but preferred, consists in interposing an interface fabric 28 between the adhesive film or the adhesive films 24 and the preform 26, still before injection of the resin into this preform 26.

The interface fabric 28 is preferably pre-cut to the correct dimensions, as shown in FIG. 5. In contrast to the above-mentioned film 24, a single fabric 28 can be cut. It is understood that this fabric 28 is to be folded in half and inserted into the groove 22a, over the adhesive films 24, so that one side portion of the fabric extends over the adhesive film deposited on the first longitudinal wall 22b of the sheath 22, and the other side portion of the fabric 28 extends over the adhesive film 24 deposited on the second longitudinal wall 22c of the sheath, inside the groove 22a.

We then obtain the assembly shown in FIG. 6.

FIG. 7 illustrates an advantageous operation of the manufacturing method, which consists in compressing the edge 26a of the preform 26 to which the sheath 22 is intended to be attached (operation a4)).

This compression can be done by means of a press for example. Preferably, the edge 26a of the preform 26 is compressed until it reaches a thickness representing 75% to 95% of a maximum transverse width or dimension of the groove 22a of the sheath 22 at the end of the method. Before compression of the preform, its thickness can be about 120% compared to the final thickness of the vane due to the bulging mentioned above.

FIG. 8 illustrates a subsequent operation (a5)) of the method during which the sheath 22, equipped here with the adhesive films 24, and optionally the interface fabric 28, is positioned on the optionally compressed edge 26a of the preform 26.

The sheath of FIG. 8 is then positioned in a mould 30 which is closed (FIG. 9) for example with a counter-mould. Closing the mould 30 must allow sufficient pressure to be applied to the sheath 22 in order to prevent resin from covering the sheath during injection. This pressure can cause a deformation of the sheath, in particular a reduction in the width of the groove 22a, which will thus adopt a value corresponding to the desired cumulative thickness of the vane, the film or films and the interface fabric.

The successive operations a1) to a5), some of which are optional, represent a first step a) of the manufacturing method.

During a second step b) of the method, resin is injected into the mould 30 and is intended to impregnate the preform 26 and to come into contact with the interface fabric 28 when present, or otherwise the adhesive film and the sheath. After the resin has polymerized and cured, the sheath 22 is integral with the vane by means of the adhesive films 24 and the resin.

The blade 10 thus obtained, after polymerization of the resin, is advantageous in that its sheath 22 is perfectly positioned and maintained on the vane 12.

FIG. 10 illustrates an alternative embodiment of the manufacturing method according to the invention, in which the adhesive film 24 is glued on the preform 26 and not to the sheath 22. It is then understood that the sheath 22 is then positioned and mounted on the edge 26a of the preform 26, to which the adhesive film 24 is glued. The injection and the polymerization of the resin in the preform located in the mould 30, can then take place.

Prior to this step, an interface fabric 28 may be positioned on the preform 26. The adhesive film 24 is then glued on the interface fabric 28, prior to the positioning of the sheath 22 on the edge 26a of the preform 26 and on the adhesive film 24.

The present invention also relates to a composite blade 10 obtained by the aforementioned method, as well as a method for repairing this type of blade. When the sheath 22 is damaged and needs to be replaced, the method comprises the steps consisting in:

removing the sheath 22 and the adhesive film 24, the interface fabric 28 being intended to remain on the leading edge of the vane when this fabric is present, and gluing a new sheath, in particular on the interface fabric when it is present.

The invention claimed is:

1. A method for repairing a blade that includes a vane having a pressure side and a suction side which extend from a leading edge to a trailing edge of the vane, a metal sheath extending along the leading edge of the vane, at least one adhesive film interposed between the sheath and the leading edge of the vane, and at least one interface fabric interposed between the vane and the adhesive film, wherein the sheath of the blade is damaged and needing to be replaced, the method comprising:

removing the sheath and the adhesive film, and maintaining the interface fabric on the leading edge of the vane; and gluing a new sheath on the interface fabric.

2. The method according to claim 1, wherein said adhesive film is cut according to a shape of an edge of a preform utilized to form the blade of the vance and/or the sheath.

3. The method according to claim 1, wherein the adhesive film is glued on an edge of a preform prior to the positioning of the sheath on said edge, the preform utilized to form the blade of the vane.

4. The method according to claim 1, wherein the sheath is dihedral in shape and defines a groove with a V-shaped cross-section, said at least one adhesive film being glued on the sheath within the groove.

5. The method according to claim 4, wherein a first adhesive film is glued in the groove on a first longitudinal wall of the sheath and a second adhesive film is glued in the groove on a second longitudinal wall of the sheath.

6. The method according to claim 4, wherein, prior to the positioning of the sheath on an edge of a preform utilized to form the blade of the vane, the edge is compressed.

7. The method according to claim 6, wherein the edge of the preform is compressed until the edge reaches a thickness representing 75% to 95% of a maximum transverse width or dimension of the groove.

8. The method according to claim 6, wherein the preform is moistened prior to compressing its edge.

9. The method according to claim 1, wherein the sheath defines a groove, and wherein a single the interface fabric is folded and inserted within the groove.

10. The method according to claim 1, wherein the adhesive film or the interface fabric is/are heated to promote adhesion.

11. The method according to claim 1, wherein the adhesive film protrudes from the sheath and extends onto surfaces of a preform not covered by the sheath, the preform utilized to form the blade of the vane.

12. The method according to claim 1, wherein, prior to the positioning of the sheath on an edge of a preform, the edge is compressed, wherein the preform is utilized to form the blade of the vane.

13. The method according to claim 12, wherein the preform is moistened prior to compressing the edge.

* * * * *

UNITED STATES PATENT AND TRADEMARK OFFICE
CERTIFICATE OF CORRECTION

| | |
|---|---|
| PATENT NO. | : 12,203,389 B2 |
| APPLICATION NO. | : 17/779794 |
| DATED | : January 21, 2025 |
| INVENTOR(S) | : Adrien Touze et al. |

Page 1 of 1

It is certified that error appears in the above-identified patent and that said Letters Patent is hereby corrected as shown below:

In the Claims

| Column | Line | |
|---|---|---|
| 6 | 24 | Claim 2, delete "vance" and insert -- vane -- |
| 6 | 48 | Claim 9, delete "a single the" and insert -- the -- |

Signed and Sealed this
Twenty-third Day of December, 2025

John A. Squires
*Director of the United States Patent and Trademark Office*